(12) United States Patent
Schneider et al.

(10) Patent No.: US 11,831,608 B2
(45) Date of Patent: Nov. 28, 2023

(54) APPLICATION FIREWALLS BASED ON SELF-MODELING SERVICE FLOWS

(71) Applicant: NVIDIA Corporation, Santa Clara, CA (US)

(72) Inventors: Christopher Schneider, Fife (GB); William Bartig, Bellevue, WA (US); Daniel Rohrer, Cary, NC (US); Andrew Woodard, Buckinghamshire (GB)

(73) Assignee: NVIDIA Corporation, Santa Clara, CA (US)

( * ) Notice: Subject to any disclaimer, the term of this patent is extended or adjusted under 35 U.S.C. 154(b) by 384 days.

(21) Appl. No.: 16/773,322

(22) Filed: Jan. 27, 2020

(65) Prior Publication Data
US 2021/0234833 A1    Jul. 29, 2021

(51) Int. Cl.
*H04L 9/40*      (2022.01)
*G06N 20/00*     (2019.01)

(52) U.S. Cl.
CPC ......... *H04L 63/0245* (2013.01); *G06N 20/00* (2019.01)

(58) Field of Classification Search
CPC ............................ H04L 63/0245; G06N 20/00
USPC ......................................................... 726/14
See application file for complete search history.

(56) References Cited

U.S. PATENT DOCUMENTS

| 10,922,163  | B2* | 2/2021  | Spencer    | G06F 11/0751 |
| 11,461,462  | B1* | 10/2022 | Lan        | G06F 21/56   |
| 2020/0252802 | A1* | 8/2020  | Pachauri   | H04W 8/26    |
| 2020/0342306 | A1* | 10/2020 | Giovannini | G06N 3/0454  |
| 2020/0356898 | A1* | 11/2020 | Claussen   | H04M 1/72403 |
| 2021/0077060 | A1* | 3/2021  | Kim        | A61B 8/5269  |
| 2021/0117484 | A1* | 4/2021  | Sollami    | G06F 40/44   |
| 2021/0168165 | A1* | 6/2021  | Alsaeed    | G06N 5/04    |

OTHER PUBLICATIONS

Pubal, Jason. "Web Application Firewalls." Gold Certification, Sans Institute (2015).

* cited by examiner

*Primary Examiner* — Moeen Khan
(74) *Attorney, Agent, or Firm* — Taylor English Duma L.L.P.

(57) ABSTRACT

In various examples, firewalls may include machine learning models that are automatically trained and applied to analyze service inputs submitted to input processing services and to identify whether service inputs are desirable (e.g., will result in an undesirable status code if processed by a service). When a service input is determined by a firewall to be desirable, the firewall may push the service input through to the input processing service for normal processing. When a service input is determined by the firewall to be undesirable, the firewall may block or drop the service input before it reaches the input processing service and/or server. This may be used to prevent the service input, which is likely to be undesirable, from touching a server that hosts the input processing service (e.g., preventing a crash).

20 Claims, 11 Drawing Sheets

APPLICATION FIREWALLS BASED ON SELF-MODELING SERVICE FLOWS

BACKGROUND

Computer services may receive service inputs over a computing network. To do so, endpoints of the computing network may be implemented on a front-end of a computing system to receive the service inputs and act as a proxy to resources that correspond to the services behind that front-end. For example, an external client may interface with a computer service of an application executing on a server using a particular socket or port of that server. When operating software that uses service inputs to a computer service, the computer service may be exposed to service inputs that cause the software to generate faults, errors, crashes, or otherwise undesirable results. As an example, invalid, unexpected, and/or random service inputs may cause a server-side error, where the precise cause of the error is unknown.

In conventional systems, undesirable service inputs are often detected reactively, typically by retroactively diagnosing disruptions to the service. In particular, the service inputs processed by the service at the server may be determined by the server as undesirable based on the occurrence of an undesirable result (e.g., because an application and/or the service crashes). A technique named "Fuzzing" has been used to proactively test a service in an attempt to make the service more robust in its ability to handle invalid, unexpected, and/or random service inputs. Another proactive approach that has been attempted uses Web Application Firewalls (WAFs) to prevent unexpected traffic from reaching an application on a server. These WAFs block traffic to a service based on heuristics that are implemented by a set of rules designed to protect against common and predictable occurrences, such as cross-site scripting (XSS) attacks or Structured Query Language (SQL) injection. However, WAFs may fail when against uncommon and unpredictable occurrences and may be time-consuming and tedious to build and deploy.

SUMMARY

Embodiments of the present disclosure relate to application firewalls based on self-modeling service flows. More specifically, systems and methods are disclosed that may automatically generate and apply firewalls to intercept service inputs submitted to an input processing service associated with an application and identify whether a service input is desirable (e.g., expected, valid, etc.).

In contrast to conventional systems, such as those described above, disclosed approaches provide for automatically generating and applying firewalls that are trained based on actual service inputs to input processing services. Such a firewall can be a dynamic application-specific firewall that intercepts data inputs submitted to an input processing service and identifies whether an input is good or otherwise desirable (e.g., expected). When the input is determined to be good, the firewall can allow the input through to the input processing service for normal processing. When the input is determined to be bad or undesirable, the firewall can block the input before it reaches the input processing service (e.g., before it reaches a server).

Such a firewall can be continually updated to integrate changes in inputs received by an input processing service over time. For example, a dynamic application-specific firewall can be implemented using a trained model that can analyze features of the inputs to predict whether an input is good (e.g., expected). Using updates to this trained model, the dynamic application-specific firewall can automatically update and patch vulnerabilities in the firewall service (e.g., based on false positives or false negatives predicted using the trained model). In this way, computing systems can implement dynamic application-specific firewalls to automatically intercept inputs over time that are not predicted to be good.

BRIEF DESCRIPTION OF THE DRAWINGS

The present systems and methods for generating and implementing application firewalls based on self-modeling service flows are described in detail below with reference to the attached drawing figures, wherein.

DETAILED DESCRIPTION

Figure 1A:
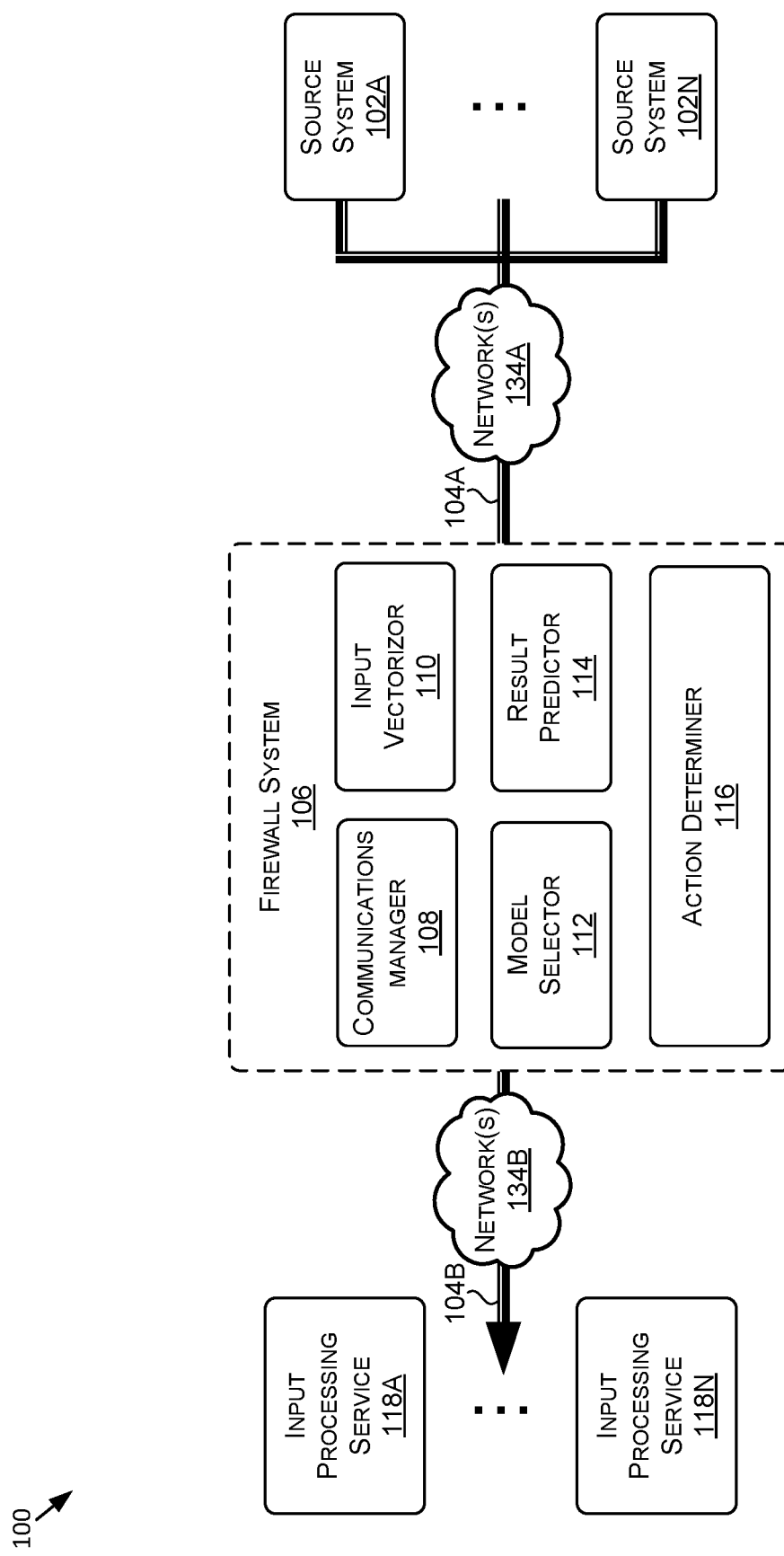
FIG. 1A is a block diagram showing an example operating environment that includes a firewall system, in accordance with some embodiments of the present disclosure.

Systems and methods are disclosed related to application firewalls based on self-modeling service flows. More specifically, systems and methods are disclosed that may automatically generate and apply firewalls to intercept service inputs submitted to input processing services associated with applications and identify whether service inputs are desirable (e.g., expected, valid, etc.).

Disclosed approaches provide techniques that may be used to automatically generate and apply firewalls that are trained based on actual service inputs to input processing services. For instance, such a firewall can be an application-specific firewall. The firewall may intercept service inputs submitted to a input processing service of an application and be used to identify whether a service input is desirable (e.g., expected, valid, etc.). When a service input is determined to be desirable (or is not determined to be undesirable), the application firewall may push or otherwise allow the service input through to the input processing service for normal processing. When a service input is determined to be undesirable (or is not determined to be desirable), the application firewall may block or drop the service input before it reaches the input processing service and/or server. This may be used to prevent the service input, which is likely to be undesirable, from accessing a server that hosts the input processing service (e.g., preventing a crash).

In various embodiments, such a firewall can be continually updated to integrate changes in service inputs received by an input processing service(s) over time. For example, an application firewall may be implemented using a trained Machine Learning Model (MLM)(s) that can analyze features of the service inputs. The results of such an analysis can be used to predict (for example and without limitation), whether a service input is desirable and/or a result of the service processing the service input. (e.g., a status code or type of status code that would be caused by the processing). Using updates to this trained MLM, the application firewall may be automatically updated, such as to patch vulnerabilities (e.g., based on false positives or false negatives predicted using the trained MLM).

Data used to train the MLM(s) can come from an application related to the input processing service (e.g., the application on which the application firewall will be used). This data can include service inputs received by the service and corresponding status codes generated as a result of the service processing the service inputs. Such service inputs and/or corresponding status codes may, for example, be extracted from log files associated with the service (e.g., generated by the service, application, and/or server). For example, a log file can have multiple columns or fields where some of the columns may be representative of service inputs (e.g., by storing extracted and/or parsed values/parameters of service inputs) and another column may be representative of outputs (e.g., status codes or labels corresponding to status codes) resulting from the processing of the service inputs. The corresponding status codes can be generated during typical operation of the service to indicate the result of running the received service inputs (e.g., stored in the log files). One or more of the status codes may be generated in accordance with a standard lexicon or specification. For example, one or more status codes may be Hypertext Transfer Protocol (HTTP) response status codes. A status code $2xx$ may indicate the server successfully accepted the service input request, a status code $4xx$ may indicate the server could not understand service input request, and a status code $5xx$ may indicate the server has encountered an error or is otherwise incapable of performing a service input request (where xx are integers).

To apply the service inputs (e.g., from the log files for training) submitted to an input processing service to an MLM(s), the service inputs may be converted into a vectorized format. Vectorizing the service inputs allows for easy extraction and analysis of features of the service inputs (e.g., to understand the relationship(s) between the features and an output or results—desirable/undesirable and/or status code). Vectorization of the service inputs can take advantage of standardization in web service logs. For instance, for W3C logs, there is a Requests for Comments (RFC) section that indicates what headers are possible and what information should be contained within certain columns for the service inputs. As a non-limiting example, a data schema can be used to vectorize inputs (e.g., a data schema corresponding to a specific application instance can be used to vectorize inputs related to that application). In addition, in some embodiments, one or more portions of a service input (e.g., fields or parameters) may be manipulated prior to vectorization. For example, when a field or parameter of service inputs is open-ended, corresponding values can undergo manipulation prior to vectorization (e.g., using a map, dictionary, and/or hash table). Manipulating data in this manner allows for open-ended fields or parameters to be turned into a standardized form. As another example, multi-parameter service inputs can be parsed such that each ampersand becomes or delineates an individual parameter, or value in the data.

One or more MLM(s) in accordance with the present disclosure may be implemented using one or more machine learning primitives, which may effectuate a multi-step-ahead forecasting model. For instance, a lightweight primitive that can be used to form at least a portion of an application firewall is a Hidden Markov Model (HMM). Other examples of suitable primitives are a Restricted Boltzmann Machine (RBM) or a Deep Belief Network (DNM). Further examples include a Long Sort-Term Memory (LSTM) network and/or a Recurrent Neural Network (RNN). One or more primitives used to implement the MLMs for an application firewall can be selected based on, for example, the complexity of service inputs received by an input processing service(s) that will use the application firewall.

To train an MLM for use in an application firewall, actual service inputs to the application (e.g., of the input processing service) can be used in a training data set and/or validation data set as well as actual outputs and/or results of processing the service inputs (e.g., status codes used to form ground truth for corresponding service inputs). In embodiments, the training data set can be batched (e.g., into blocks of 100) and used to train candidate models (e.g., using 80% of the data as training data). Upon completion of training, the candidate models can be tested (e.g., using the remaining 20% of the data as a verification data set). In some embodiments, a candidate model with the highest level of accuracy can be selected from the candidate models based on the testing (or other selection criteria may be used). This selected candidate model can then be used as an MLM of an application firewall—to analyze service inputs into the input processing service. Due to this training process, there may be some amount of bootstrap time during which service inputs are collected and an initial model is trained before a fully functional application firewall is deployed that can accurately predict and/or intercept inputs that are not likely to be good.

When a HMM is used as a primitive of an MLM, the learning algorithm Viterbi can be used to train the candidate models. When an RBM or DBM is used as a primitive of an MLM, Contrastive Divergence algorithms can be used to train the candidate models. Further, when an RBM is used as a primitive of an MLM, the MLM can be based on a Generative Adversarial Network (GAN) architecture. A GAN architecture can be comprised of a synthesizer portion (e.g., generator) and a discriminator portion. The synthesizer portion can be trained to predict a status code label from a service input (e.g., where the service input is in a vectorized form), and the discriminator portion can then evaluate the predicted status code label based on a likelihood the service input is desirable (e.g., the discriminator may output a prediction of whether the status code label is likely to be a desirable or undesirable).

In embodiments, a firewall system can implement an MLM of an application firewall using a passive flow where a client receives an updated MLM (e.g., an updated version of the MLM) from an infrastructure that sits on the back-end. In this passive flow, log data can be taken and batched, sent to a back-end server where the data is parsed for training and candidate models are generated. Next, a write-only MLM can be selected from the candidate models and published to the front-end of a firewall system for use in the application firewall. This front-end MLM can be updated periodically in this manner to keep the window of inference up-to-date (e.g., every 15 minutes). In some embodiments, for instance, when the MLM comprises a GAN (e.g., based on an RBM), this published front-end MLM can be only the discriminator portion of the GAN. In another embodiment, the firewall system can implement the MLM using an active flow where the client can generate and run its own MLM (e.g., GAN) on the front-end (e.g., continuously).

A trained MLM can be used to implement an application firewall for a particular application(s) corresponding to the input processing service (e.g., based on the configuration of the application). For instance, the MLM may be used for an application with the same configuration as the application from which data is used to train the MLM. As an example, if an application with a particular configuration is being executed by a first server and the same application with the same configuration is being executed by a second server such that the log files for the application instances are contiguous, the same application firewall can be used for both application instances. However, if an application with a particular configuration is being executed by a first server and the same application has a different configuration when executed by a second server such that the log files for the two application instances are not contiguous, the same application firewall might not be used for both application instances.

A firewall can be integrated with an input processing service such that the firewall intercepts all service inputs to the input processing service. In particular, when a service input is sent over a computing network for processing by the input processing service, the service input can be intercepted by a firewall system. Upon interception of the service input by the firewall system, the service input can first be converted into a vectorized form, as discussed herein. The MLM of the application firewall can then analyze this vectorized input. For instance, the MLM can be used by the firewall to predict a likelihood of a desirable outcome that indicates the input processing service should function at a server as expected when running or processing (e.g., executing) the service input. When the analysis indicates the likelihood of the desirable outcome is above a predefined threshold (e.g., the service input is predicted to be desirable), the service input can be pushed (or allowed) through to the input processing service. When the analysis indicates the likelihood of the desirable outcome is below a same or different predefined threshold (e.g., the service input is predicted to be undesirable), the service input may be intercepted prior to receipt by the input processing service (e.g., prior to receipt at a server). As an example, the service input can be intercepted by dropping or blocking the service input. In some embodiments, when the service input is predicted to be undesirable, a validation process may be initiated (e.g., to determine whether the prediction was a false positive). For example, the validation process may include executing a CAPTCHA. In some embodiments, false positives (e.g., corresponding to passing validations) may be used to update the MLM and/or permit passage of service inputs that were predicted to be undesirable.

With reference to FIG. 1A, FIG. 1A is an example diagram of an operating environment 100 that includes a firewall system 106, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the operating environment 100A may be implemented on one or more instances of the computing device 700 of FIG. 7.

The operating environment 100 may include, among other elements, one or more source systems 102A-102N (referred to collectively herein as "source systems 102"), a firewall system 106, and one or more input processing services 118A-118N (referred to collectively herein as "input processing services 118"). In embodiments, the firewall system 106 may include a communications manager 108, an input vectorizer 110, a model selector 112, a result predictor 114, and an action determiner 116. Although only a few components and/or features of the firewall system 106 are illustrated in FIG. 1A, this is not intended to be limiting. For example, the firewall system 106 may include additional or alternative components, such as those described below with respect to FIGS. 3A-3C.

Components of the operating environment 100 may communicate over a network(s) 134A and/or 134B (referred to collectively herein as "network(s) 134"). The network(s) 134 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the operating environment 100 may communicate with one or more of the other components via one or more of network(s) 134.

The source systems 102 may include a smart phone, a laptop computer, a tablet computer, a desktop computer, a wearable device, a game console, a virtual reality system (e.g., a headset, a computer, a game console, a remote(s), a controller(s), and/or other components), a streaming device, (e.g., NVIDIA SHIELD), a smart-home device that may include an intelligent personal assistant, a server(s), a workstation(s), and/or another type of device capable of generating and/or communicating service input(s) to the firewall system 106.

The source systems 102 may include one or more components and features for communicating across one or more communication channels. The source systems 102 may be configured to communicate via any number of communication channels and/or across network(s) 134. For example, to communicate with one or more of the input processing services 118 of FIG. 1A, the source systems 102 may use an Ethernet or Wi-Fi connection through a router to access the Internet in order to communicate service input(s) to one or more of the input processing services 118. A service input can be any input received for processing by one or more of the input processing services 118. The source systems 102 can connect to the firewall system 106 using a network connection. Through such a network connection, the source systems 102 can send service input(s) to various endpoints for processing (e.g., corresponding input processing service 118).

In embodiments, the firewall system 106 can intercept service input(s) prior to receipt by the input processing services 118. For instance, a service input 104A can be sent by one or more of the source systems 102 via a communication channel A. In intercepting the service input(s) 104A prior to receipt by the input processing services 118, the firewall system 106 can identify whether a service input is desirable. A desirable service input can be a service input that is expected, nonrandom, and/or valid. In embodiments, desirability can be indicated for a service input based on a likely corresponding status code (e.g., determined using the firewall system 106) that would result from the service input being processed by a corresponding input processing service 118. In various examples, such status codes may be used to train one or more MLMs used by the result predictor 114 of the firewall system 106 to predict a likelihood (e.g., as a confidence score) a service input is desirable and/or what status code will result from the service input being processed. The action determiner 116 may use such predictions to determine one or more actions with respect to the service inputs, such as to block a service input, and/or to provide a service input to a corresponding input processing service 118 and/or a server for further processing.

Corresponding status codes can be generated during typical operation of the input processing services 118 to indicate the success, failure, or other outcome of running or processing the received service inputs. For example, as a result of an input processing service 118 and/or a server processing a service input, the input processing service 118, an application corresponding to the input processing service 118, a server hosting the input processing service 118, and/or a different service may generate a status code. A generated status code may be stored in a log file in association with the input processing service 118, an application corresponding to the input processing service 118, and/or a record of the service input that caused the status code to be generated, such as a log file 200 of FIG. 2.

In some examples, one or more status codes may be Hypertext Transfer Protocol (HTTP) response status codes. A status code 2xx may indicate the server (e.g., hosting the input processing service 118) successfully accepted, understood, and received the service input request. In particular, a service input corresponding to a status code 2xx (where xx are integers) can be a desirable service input because the service input is likely to be expected and/or valid. A status code 4xx may indicate the server could not understand the service input request and/or there was a client error. In some embodiments, a service input corresponding to a status code 4xx can still be designated as a desirable service input because the service input is unlikely to cause harm such as a server error. Finally, a status code 5xx may indicate the server has encountered an error or is otherwise incapable of performing a service input request. Such a service input corresponding to a status code 5xx can be designated as an undesirable service input because the service input is likely to be unexpected and/or invalid, and may likely interfere with normal operation of the server.

When a service input is determined to be desirable by the firewall system 106 using the result predictor 114, the firewall system 106 may, using the communications manager 108, push (allow) the service input through to the input processing services 118 for normal processing (as described by the action determiner 116). For instance, a service input 104A can be pushed (or allowed) to an input processing service 118 by the communications manager 108 as service input 104B (e.g. via a communication channel). When a service input is determined to be undesirable by the firewall system 106 using the result predictor 114, the action determiner 116 may determine to block or drop the service input before it reaches the input processing services 118 (e.g., prevent the service input 104A from proceeding to a server(s) hosting the input processing services 118 as service input 104B via a communication channel).

In more detail, various components of the firewall system 106 can intercept, analyze, and determine actions to perform based on service inputs. In particular, the communications manager 108 can receive (e.g., intercept) a service input(s) 104A designated for processing by the input processing services 118 via a communication channel. For example, the communications manager 108 may be configured to receive service input(s) from the source systems 102. The communications manager 108 may also be configured to transmit the service input(s) to the input processing services 118 for processing on one or more servers. For example, the communications manager 108 may transmit a service input to the input processing services 118 based at least in part on the service input being determined to be desirable (e.g., by the firewall system 106).

Figure 2:
FIG. 2 is a diagram illustrating an example of a log file, in accordance with some embodiments of the present disclosure.

In addition, in some embodiments, the communications manager 108 may be configured to receive log files, such as a log file 200 of FIG. 2, from the input processing services 118, a server(s) hosting the input processing services 118, and/or from one or more centralized data aggregators (e.g., cloud storage). These log files may be used to refine/update aspects of the firewall system 106, such as the MLM(s) used to make predictions regarding service inputs through additional training. Such log files can be log files associated with the input processing services 118. For instance, as described herein, the log files can be generated by the input processing services 118 and/or by associated applications, and/or servers.

In some embodiments, upon receipt by the communications manager 108, a service input can be vectorized by the input vectorizer 110. As a non-limiting example, the input vectorizer 110 can use a data schema to vectorize service inputs (e.g., a data schema corresponding to a specific application instance can be used to vectorize service inputs related to that application). In addition, in some embodiments, the input vectorizer 110 may manipulate one or more portions of a service input (e.g., fields or parameters) prior to vectorization. For example, when a field or parameter of service inputs is open-ended, corresponding values can undergo manipulation prior to vectorization (e.g., using a map, dictionary, and/or hash table). Manipulating data in this manner may allow for open-ended fields or parameters to be turned into a standardized form. As another example, the input vectorizer 110 can parse multi-parameter service inputs such that each ampersand becomes or delineates an individual parameter, or value in the data.

Further, upon receipt of a service input, the model selector 112 can be used to select an MLM that can be used to evaluate (e.g., make predictions regarding) the desirability of the service input. For instance, in some embodiments, the model selector 112 can determine whether an MLM has been generated for evaluating the desirability of a service input. Due to a training process that may be used to generate an MLM, there may be some amount of bootstrap time during which service inputs are collected and an initial MLM is trained before a fully functional MLM is deployed that can accurately make predictions regarding whether inputs are or are not likely to be good or desirable.

A determination whether an MLM has been generated can be made based on, for example, a configuration of an input processing service 118, corresponding service input(s), and/or an application corresponding to the service input(s). For example, one or more network communications received by the communications manager 108 may include a service input and/or an identifier that indicates an input processing service 118 for processing the service input (e.g., at a server). In some examples, the identifier may be an application identifier of an application corresponding to the input processing service 118. In some examples, the identifier is of a network port or a web socket. For example, an input processing service 118 may be designated for processing a service input by a network port or a web socket that corresponds to the service input, which may be included in one or more network communications (e.g., specified in an HTTP request) and/or determined from the one or more network communications by the firewall system 106. Using the identifier, the communications manager 108 may determine the input processing service 118 and/or corresponding application (e.g., assigned to the network port or web socket), then based on that determination the model selector 112 may determine whether a suitable MLM is available to evaluate the service input and/or which MLM to use for the service input (e.g., as each port, web socket, input processing service 118, and/or application may be associated with a particular MLMs).

When an MLM has not been generated or is otherwise unavailable for a service input, the model selector 112 can select one or more MLMs and/or select from one or more machine learning primitives to include in the MLMs, which may effectuate a multi-step-ahead forecasting MLM. Such training can occur using a model training system, such as a model training system 302 of FIG. 3A. While, not depicted in FIG. 1A, in embodiments, such a model training system can be incorporated into the firewall system 106. In selecting a machine learning primitive for use in an MLM, the model selector 112 can select the one or more primitives based on, for example, the complexity of service inputs related to an input processing service 118. For instance, an extremely lightweight primitive that can be used to form an application firewall is a Hidden Markov Model (HMM). Another example of a suitable primitive is a Restricted Boltzmann Machine (RBM). Further examples include a Long Sort-Term Memory (LSTM) network and/or a Recurrent Neural Network (RNN). In other embodiments, the model selector 112 can select a primitive for use in an MLM based on a configuration of an application of the input processing services 118. In further examples, the model selector 112 may not select primitives from options, but may be pre-configured to generate an MLM corresponding to one or more primitives as needed.

In various embodiments, the model selector 112 can determine an MLM has been generated for evaluating the desirability of a service input. When a model has been generated for evaluating the desirability of a service input, the model selector 112 can select an MLM for evaluating the service input. For instance, the model selector 112 can select a model for use based on a configuration of an application of the input processing services 118 and/or the identifier of an application corresponding to the input processing service 118. Identifying an MLM that is suitable for the configuration may ensure that the service input is accurately analyzed using the MLM (e.g., does not contain additional data inputs that the MLM was not trained to evaluate).

The result predictor 114 can be used to determine whether a service input is desirable or undesirable. In particular, the result predictor 114 can run a trained MLM(s) (e.g., the MLM(s) selected by the model selector 112). A trained MLM(s) can be used to analyze the service input and make predictions regarding the service input. For instance, the MLM(s) can receive and analyze the vectorized form of the service input (e.g., generated by the input vectorizer 110). From this analysis, the MLM(s) can be used to predict confidences in at least one result being caused by processing service inputs by the service. These confidences may indicate a likelihood a desirable outcome would result from the input processing service 118 and/or server running or processing (e.g., executing) the service input. In some embodiments, this likelihood can be based on a likely status code predicted by the MLM(s) to correspond to the service input. In some embodiments, this likelihood can be based on a likely status code predicted by the MLM(s) to correspond to the service input.

The action determiner 116 can operate based on the analysis performed, for example, by the result predictor 114. When the analysis by the result predictor 114 indicates the likelihood or confidence score of the desirable outcome is above a predefined threshold (e.g., the service input is predicted to be desirable), the action determiner 116 can determine that the service input can be pushed through to the input processing services 118. When the analysis by the result predictor 114 indicates the likelihood or confidence score of the desirable outcome is below a predefined threshold (e.g., the service input is predicted to be undesirable), the action determiner 116 can determine that the service input should be intercepted. As an example, the action determiner 116 can determine that the service input should be intercepted by dropping or blocking the service input. In some embodiments, when the action determiner 116 determines that the service input is predicted to be undesirable, a validation process may be initiated (e.g., to determine whether the prediction was a false positive). Such a validation process may be initiated using the communications manager 108. For example, the validation process may include executing a CAPTCHA.

Figure 1B:
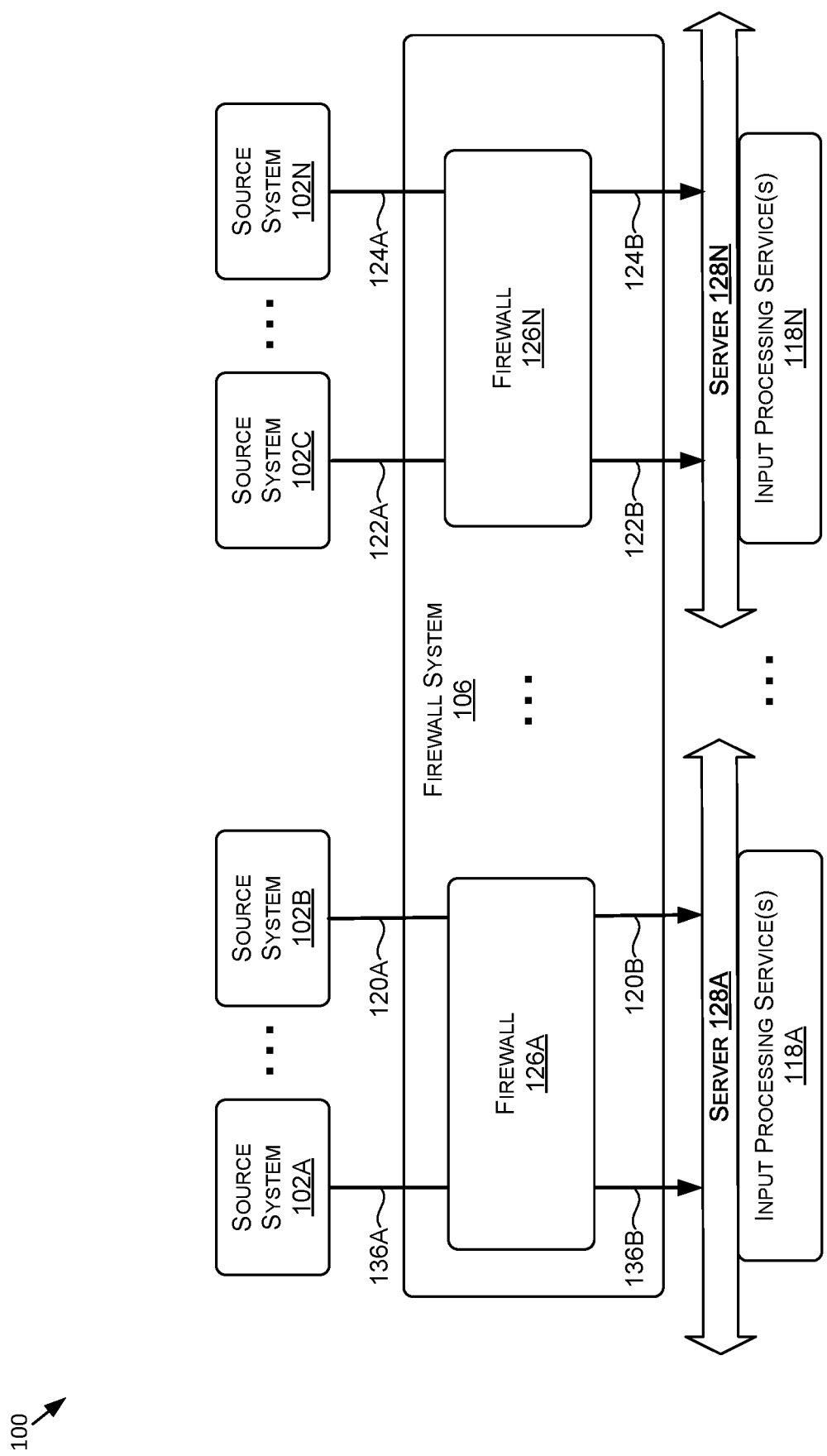
FIG. 1B is a block diagram showing an example operating environment that includes a firewall system, in accordance with some embodiments of the present disclosure.

Referring now to FIG. 1B, FIG. 1B is an example diagram of the operating environment 100 that includes a firewall system, in accordance with some embodiments of the present disclosure. It should be understood that this and other arrangements described herein are set forth only as examples. As indicated in FIG. 1B, the operating environment 100 may, in some embodiments, support any number of firewalls (e.g., of the firewall system 106). For example, FIG. 1B shows a firewall 126A through a firewall 126N (referred to collectively herein as "firewalls 126"), which may be included in the firewall system 106 of FIG. 1A. Further, the operating environment 100 may, in some embodiments, support any number of servers, such as a server 128A hosting at least the input processing service 118A and/or a server 128N hosting at least an input processing service 118N (referred to collectively herein as "servers 128").

The firewalls 126 can intercept service input(s) prior to receipt by the input processing services 118. For instance, the firewall 126A can intercept service inputs 136A and 120A prior to receipt by the input processing service 118A and the firewall 126A can intercept service inputs 122A and 124A prior to receipt by the input processing service 118N. In particular, the service inputs 136A and 120A can be received from the source systems 102A and 102B and the service inputs 122A and 124A can be received from the source systems 102C and 102N.

In intercepting the service input(s) 136A, 120A, 122A, and 124A prior to receipt by the input processing services 118, the firewalls 126 can identify whether the service input(s) 136A, 120A, 122A, and 124A are desirable (e.g., expected, valid, etc. using the result predictor 114). When a service input is determined to be desirable by a firewall 126, the firewall 126 may push the service input through to the corresponding input processing service 118 for normal processing. For instance, the service input(s) 136B, 120B, 122B, and 124B may include a subset of the service inputs the service input(s) 136A, 120A, 122A, and 124A that are pushed to the input processing services 118 by the firewalls 126. Upon receipt of the service input(s) 136B, 120B, 122B, and 124B by the input processing services 118, the input processing services 118 can process the service input(s) 136B, 120B, 122B, and 124B. When a service input is determined to be undesirable by the firewalls 126, the firewalls 126 may block or drop the service input before it reaches the input processing services 118. Blocking or dropping the service input may also prevent the service input from reaching a corresponding server 128.

Figure 1C:
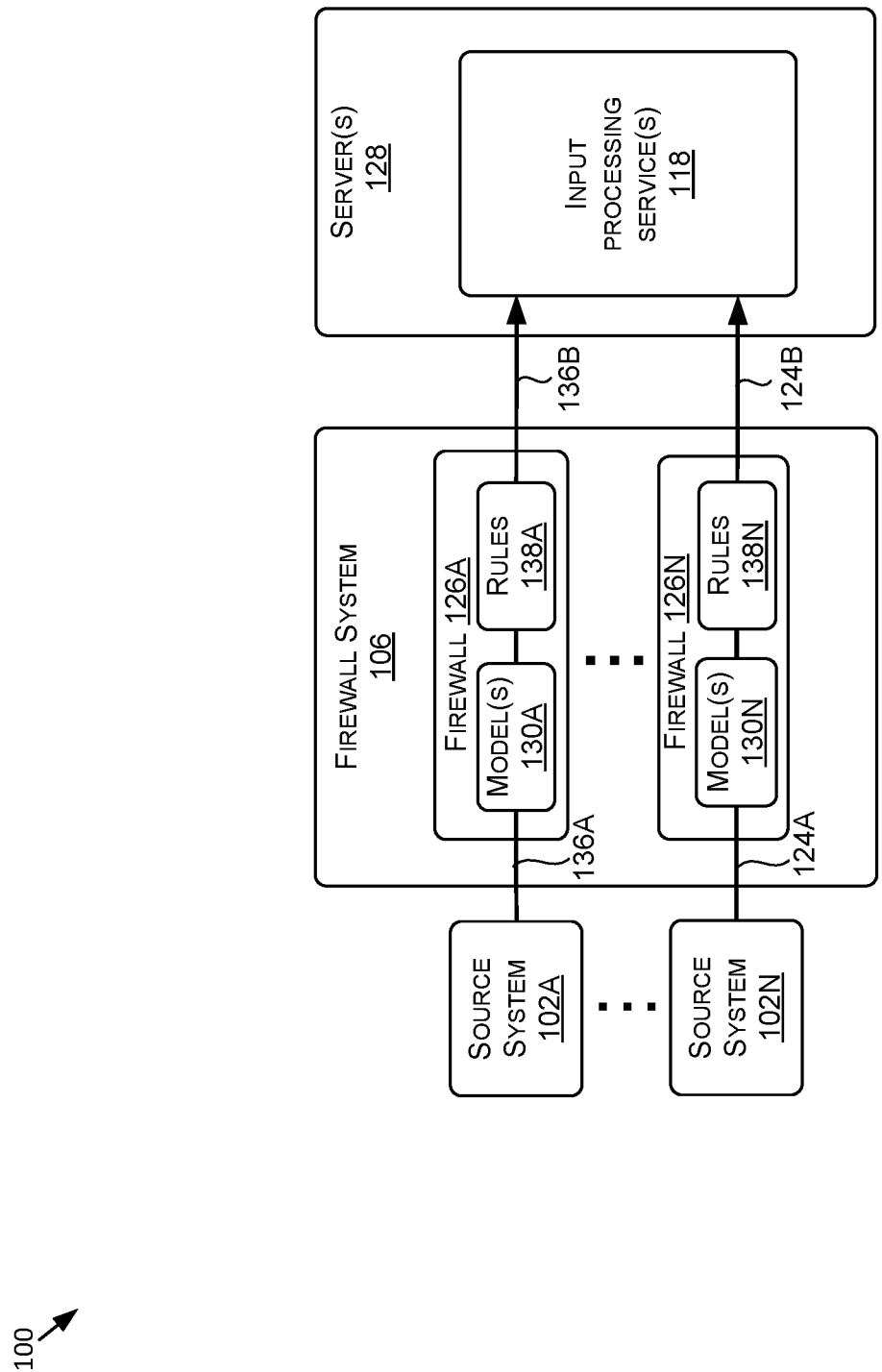
FIG. 1C is a block diagram showing an example operating environment that includes a firewall system, in accordance with some embodiments of the present disclosure.

Referring now to FIG. 1C, FIG. 1C is an example diagram of the operating environment 100 that includes a firewall system, in accordance with some embodiments of the present disclosure. It should be understood that this and other arrangements described herein are set forth only as examples. As indicated in FIG. 1C, the firewall(s) of the firewall system 106 may, in some embodiments, use an MLM(s) and a security rule(s) for evaluating the desirability of service input(s). For example, FIG. 1C shows a model 130A and rules 138A implemented on the firewall 126A and a model 130N and rules 138B implemented on the firewall 126N, which may be included in the firewall system 106 of FIGS. 1A and 1B.

The firewalls 126A and 126B can intercept service input(s) prior to receipt by the input processing service(s) 118. For instance, the firewall 126A can intercept one or more of the service inputs 136A from the source system 102A and the firewall 126N can intercept one or more of the service inputs 124A from the source system 102N prior to receipt by the input processing service(s) 118.

In intercepting one or more service input(s), the firewall 126A and the firewall 126N can respectively use the model 130A and the rules 138A and the model 130N and the rules 138N to identify whether the service inputs 136A or 124A are desirable (e.g., expected, valid, etc.). As an example, the result predictor 114 of FIG. 1A may use the model 130A to generate a prediction for a service input 136A, such as a confidence score(s), and the action determiner 116 may apply one or more portions of the prediction to the rules 138A to determine what action to take with respect to the service input 136A. As an example, a rule 138A may be to block the service input 136A based on a confidence score failing to exceed a threshold value and/or to push or permit passage of the service input 136A to the input processing service(s) 118 based on the confidence score exceeding the threshold value. As described herein, each confidence score may represent a predicted likelihood that the service input 136A is desirable and/or will result in a desirable, undesirable, or particular status code or class of status codes (e.g., 2*xx* and/or 4*xx*). The firewall 126N may operate in a similar or different manner as the firewall 126A.

When a service input 136A is determined to be desirable by the model 130A and the rules 138A, the firewall 126A may push the service input 136A through to the input processing service(s) 118 for normal processing, such that that it is included in the service inputs 136B. For instance, a service input 136B can be pushed to the input processing service(s) 118 by the firewall 126A. Upon receipt of the service input 136B by the input processing service(s) 118, the input processing service(s) 118 can process the service input 136B. Processing of the service input 136B can be performed on, for example, the server(s) 128.

When a service input 136A is determined to be undesirable using the model 130A and the rues 138A, the firewall 126A may block or drop the service input 136A before it reaches the input processing service(s) 118, such that it is not included in the service inputs 136B. Blocking or dropping the service input 136A before it reaches the input processing service(s) 118 also prevents the service input from reaching the server(s) 128. The firewall 126N may operate in a similar manner.

FIG. 2 is a diagram illustrating an example of a log file, in accordance with some embodiments of the present disclosure. A log file can have a number of fields with information. For instance, as depicted in the log file 200 in FIG. 2, examples of the fields are date, time, c-ip, cs-username, s-ip, s-port, cs-method, cs-uri-stem cs-uri-query sc-status cs(User-Agent). The log file 200 may be generated on a server, such as the server 128A of FIG. 1B, and each line, or entry in the log file 200 may be a record of a service input, such as a service input 136A or service input 120A of FIG. 1B. An entry of a service input may include any number of fields stored in corresponding columns of the log file 200, along with output status code and/or label corresponding to the status code. The status code can be generated by the input processing service that processed the service input, the server, and/or another service during typical operation to indicate a result of running the received service input. Such status codes are typically standardized. For example, a status code 200 may indicate the server successfully accepted the data input request and a status code 400 may indicate the server could not understand data input request.

As depicted in the first service input entry of the log file 200, the status code 200 resulted from processing the service input. Other examples of resulting status codes for different service input entries include a status code 400 and a status code 500. In some examples, the field s-port is an example of the identifier that indicates the input processing service for processing the service input, as described herein.

Figure 3A:
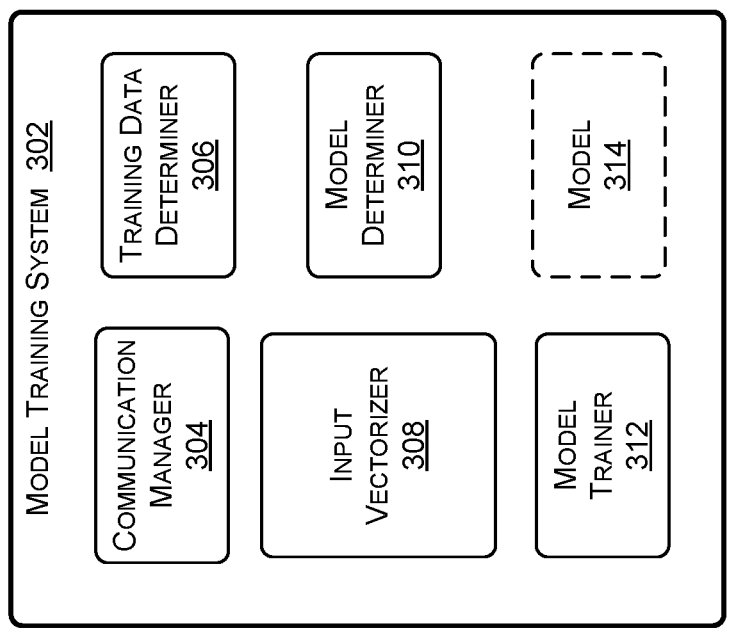
FIG. 3A is a block view of an example model training system that may be used to train firewalls, in accordance with some embodiments of the present disclosure.

FIG. 3A is a block view of an example diagram of a model training system 302 that may be used to train MLMs of firewalls, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the model training system 302 may be implemented on one or more instances of the computing device 700 of FIG. 7.

In embodiments, the model training system 302 may be used to train firewalls (e.g., one or more of the firewalls 126 as in FIGS. 1B-1C) based on self-modeling service flows. For instance, actual service inputs to an input processing service (e.g., one or more of the input processing services 118 as in FIGS. 1A-1C) can be used to form a training data set and/or validation data set for training an MLM(s) used in a firewall 126.

Various components of the model training system 302 can train and/or update MLMs for analyzing service inputs. In particular, a communications manager 304 can receive a training data set for use in training and/or updating an MLM. For example, the communications manager 304 may be configured to receive training data from a variety of sources (e.g., the input processing services 118, a data store on a device or in the cloud, a centralized data aggregate, a server, etc.). The communications manager 304 may be also configured to transmit trained MLMs to a firewall system (e.g., the firewall system 106) and/or firewall for use in analyzing service inputs, as described herein.

A training data determiner 306 can determine training data for use in training an MLM. Actual service inputs to the input processing services 118 can be used in a training data set and/or validation data set. Along with the actual service inputs, actual outputs and/or results of processing the service inputs can be used in a training data set and/or validation data set. This training data may, in some embodiment, be extracted from log files, such as the log file 200 of FIG. 2. For example, a log file can have 30 columns where 29 columns have information from the service input and a 30$^{th}$ column is the service output based on the information in the first 29 columns. Such actual outputs and/or results of processing the service inputs can be status codes that correspond to the actual service inputs and/or labels corresponding to the status codes. Such corresponding status codes can be generated during typical operation of the input processing services 118 to indicate the success, failure, or other outcome of running the received service inputs. In this way, the corresponding status codes can be used to form ground truth data for corresponding service inputs in the training data. The training data determiner 306 can also select training data based on a window of time (e.g., relevant window of inference). For instance, only relevant data may be selected by the training data determiner 306 for use in training the MLM for an input processing service 118. Relevant data can reflect a context appropriate amount of information such that the MLM can be used to accurately analyze service inputs in real-time.

In embodiments, the training data determiner 306 can batch the training data set (e.g., into blocks of 100). These batches of data can then be used to train an MLM. The training data determiner 306 can also designate a first portion of the batch of data for use in training an MLM and a second portion of the batch of data for use in validating the MLM. For instance, 80% of the data can be used for training candidate MLMs. The remaining 20% of data can be used to test the candidate MLMs (e.g., for accuracy).

Training data extracted from a log file can be vectorized by an input vectorizer 308 for use as input to an MLM. In some embodiments, the input vectorizer 308 can be the same input vectorizer as the input vectorizer 110. In other embodiments, the input vectorizer 308 can be a different input vectorizer as the input vectorizer 110. The input vectorizer 308 can use a data schema to vectorize training data (e.g., a data schema corresponding to a specific input processing service 118 and/or application and configuration thereof can be used to vectorize inputs related to that input processing service). In addition, in some embodiments, the input vectorizer 308 may manipulate one or more portions of the training data (e.g., fields or parameters of a service input) prior to vectorization. For example, when a field or parameter of service inputs is open-ended, corresponding values can undergo manipulation prior to vectorization (e.g., using a map, dictionary, and/or hash table). Manipulating data in this manner allows for open-ended fields or parameters to be turned into a standardized form. As another example, the input vectorizer 308 can parse multi-parameter service inputs such that each ampersand becomes or delineates an individual parameter, or value in the data.

A model determiner 310 can be used to select an MLM architecture that will be used to evaluate the desirability of service inputs. The model determiner 310 can select one or more machine learning primitives for use in implementing, for example, a multi-step-ahead forecasting model. In selecting a machine learning primitive for use in an MLM(s), the model determiner 310 can select the one or more primitives based on, for example, the complexity of the training data (e.g., based on service inputs) for a particular input processing service 118. For instance, an extremely lightweight primitive that can be used to form a firewall is a Hidden Markov Model (HMM). Another example of a suitable primitive is a Restricted Boltzmann Machine (RBM). Further examples include a Long Sort-Term Memory (LSTM) network and/or a Recurrent Neural Network (RNN). In other embodiments, the model determiner 310 can select a primitive for use in an MLM based on a configuration of an application of the input processing services 118. In some embodiments, the model determiner 310 can function in correlation with the model selector 112. In some example, the same MLM architecture may be used for each input processing service 118.

A model trainer 312 can be used to train an MLM(s) (e.g., a model 314). Various methods can be used to train the MLM. For instance, to train an MLM for use in a dynamic application-specific firewall for a particular application related to an input processing service, training data can be used, as selected using the training data determiner 306. This data can include data inputs and corresponding status codes extracted from one or more log files, such as the log file 200. The data inputs can also be vectorized by the input vectorizer 308. In embodiments, the data can be batched (e.g., into blocks of 100) and used to train candidate models (e.g., using 80% of the data as training data). From the candidate models, the model 314 can be selected (e.g., by the model trainer 312 and/or the model determiner 310) for deployment in a firewall (e.g., based on having a highest accuracy score on the validation dataset).

When an HMM is used as a primitive of an MLM, the model trainer 312 can train the candidate models using the learning algorithm Viterbi. When an RBM is used as a primitive of a model, the model trainer 312 can train the candidate models based on a Generative Adversarial Network (GAN) architecture. A GAN architecture can be comprised of a synthesizer portion (e.g., generator) and a discriminator portion. The synthesizer portion can be trained to predict a status code label from a service input (e.g., where the service input is in a vectorized form), and the discriminator portion can then evaluate the predicted status code label based on a likelihood the service input is desirable (e.g., the discriminator may output a prediction of whether the status code label is likely to be a desirable or undesirable).

In embodiments, the model trainer 312 can be used to select a candidate model as the model 314. In particular, the model 314 can be selected from the candidate models generated using the model trainer 312. The selected model 314 can be the candidate model with a highest level of accuracy upon completion of training. For instance, a candidate model can be selected based on the testing using validation data (or other selection criteria may be used). This selected candidate model can then be used as a model of an application firewall (e.g., the firewall 126A), intercepting and analyzing service inputs to a service.

Figure 3B:
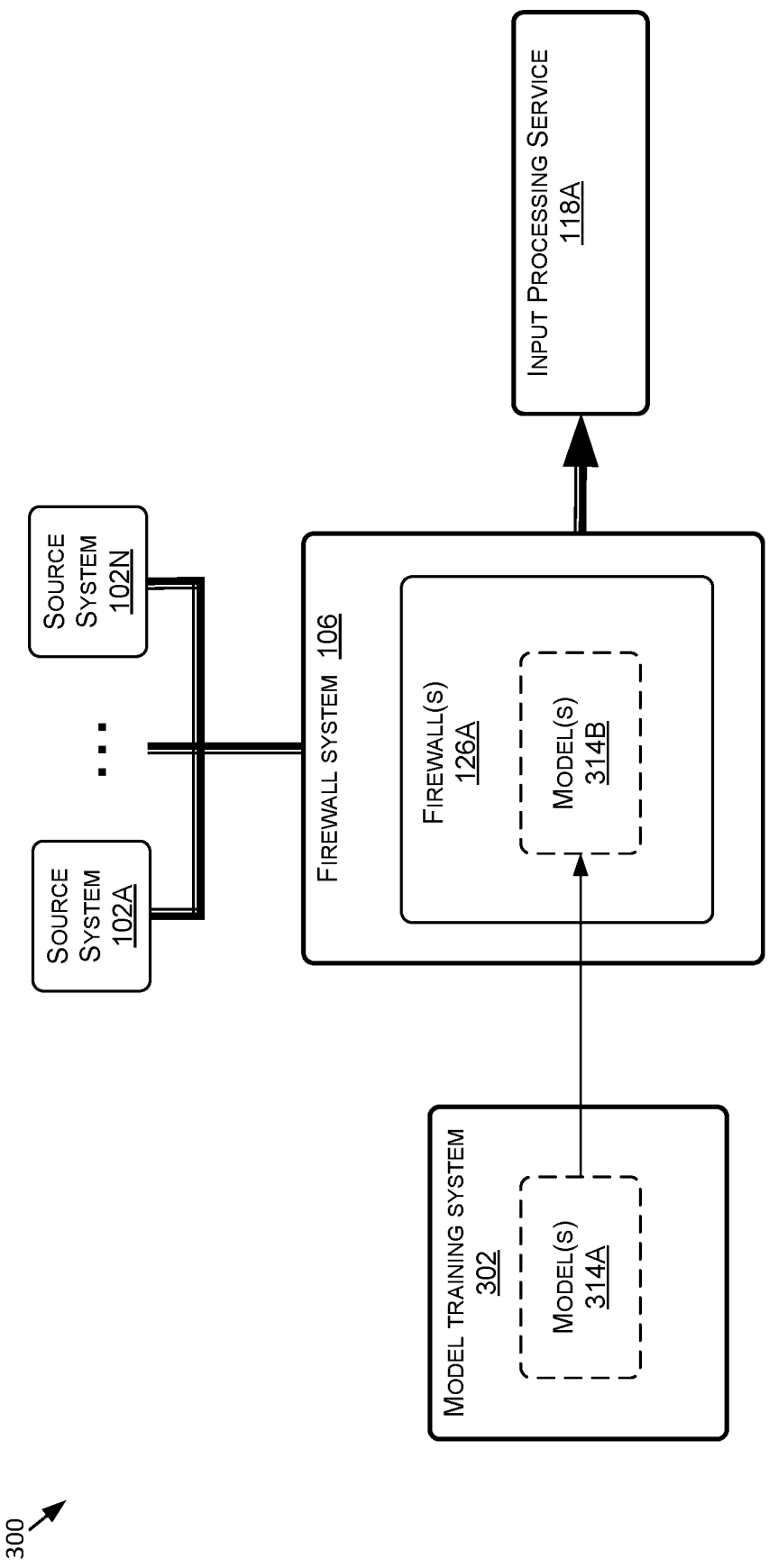
FIG. 3B is a block view of an example operating environment that includes a model training system that may be used to train application firewalls, in accordance with some embodiments of the present disclosure.

FIG. 3B is a block view of an example diagram of an operating environment 300 that includes a model training system that may be used to train application firewalls for implementation on a firewall system, in accordance with some embodiments of the present disclosure. The operating environment 300 may include, among other elements, the model training system 302, the firewall system 106, the source systems 102, and the input processing service 118A. In some embodiments, the operating environment 300 is the operating environment 100 of FIGS. 1A, 1B, and/or 1C. In embodiments, the model training system 302 may be used to train a model for use in a firewall (e.g., one or more of the firewalls 126 as in FIGS. 1B-1C) on the firewall system 106 based on self-modeling service flows. For example, upon completion of training, the model can be used by the firewall 126A on the firewall system 106 to intercept service inputs from one or more of the source systems 102 prior to receipt by the input processing service 118A (e.g., a server hosting the input processing service 118A).

The model training system 302 may be used to train an MLM for use in the firewall 126A. For example, a model 314A can be generated and/or trained by the model training system 302 using components of the model training system 302, as discussed, for instance, with reference to FIG. 3A. Upon completion of training and/or updating the model 314A, one or more portions of the model 314A may be published as the model 314B for use by the firewall 126A on the firewall system 106.

In some embodiments, the firewall system 106 can implement the MLM(s) of the firewall 126A using a passive flow where the firewall system 106 receives the model 314B as an updated model from the model training system 302 that sits on a back-end of the operating environment 300. In this passive flow, log data can be taken and batched, sent to the model training system 302 on a back-end server where the data is parsed and candidate models are generated. Such a process is also discussed in relation to FIG. 3A. A write-only model, for instance, the model 314B, can be published to a front-end of the firewall system 106 for use in the firewall 126A. This front-end model, the model 314B, can be updated periodically in this manner (e.g., by the model training system 302) to keep the window of inference up-to-date (e.g., every 15 minutes).

Figure 3C:
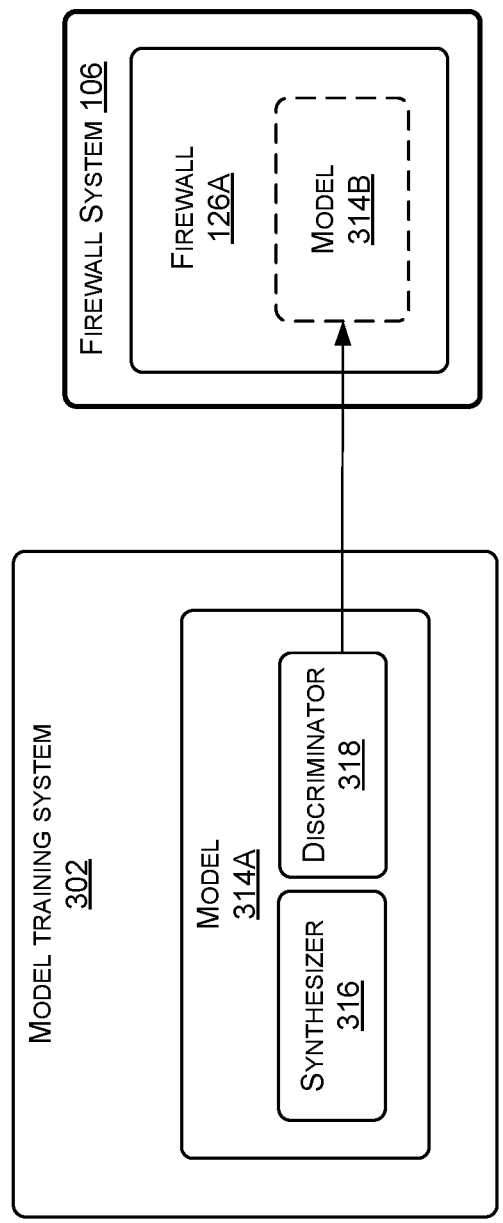
FIG. 3C is a block view of an example implementation of a GAN-based MLM in a firewall system, in accordance with some embodiments of the present disclosure.

FIG. 3C is a block view of an example implementation of a GAN-based MLM in the firewall system 106, in accordance with some embodiments of the present disclosure. The model 314A can be generated and/or trained using components of the model training system 302, as discussed, for instance, with reference to FIG. 3A. The model 314A can comprise a GAN (e.g., based on an RBM). A GAN architecture can be comprised of a synthesizer portion 316 (e.g., a generator) and a discriminator portion 318. The synthesizer portion 316 can be trained to predict, as an example, a status code label from a service input (e.g., where the service input is in a vectorized form). The discriminator portion 318 can then evaluate the predicted status code label based on a likelihood the service input is desirable (e.g., the discriminator may output a prediction of whether the status code label is likely to be desirable or undesirable).

Upon completion of training and/or updating the model 314A, the model 314B can be published for use by the firewall 126A on the firewall system 106. In embodiments, the firewall system 106 can implement the model 314B of the firewall 126A using a passive flow where the firewall system 106 receives an updated model from the model training system 302 that sits on a back-end. A write-only model, for instance, the model 314B, can be published to the front-end of the firewall system 106 for use in the firewall 126A. This front-end model, the model 314B, can be updated periodically in this manner (e.g., by the model training system 302) to keep the window of inference up-to-date (e.g., every 15 minutes). In some embodiments, the published front-end model, the model 314B, may be only the discriminator portion 318 of the GAN (e.g., the model 314A). In another embodiment, the firewall system 106 can implement the model 314B using an active flow where the firewall system 106 can generate and/or train and run its own model (e.g., GAN or portion thereof) on the front-end (e.g., continuously).

Figure 4:
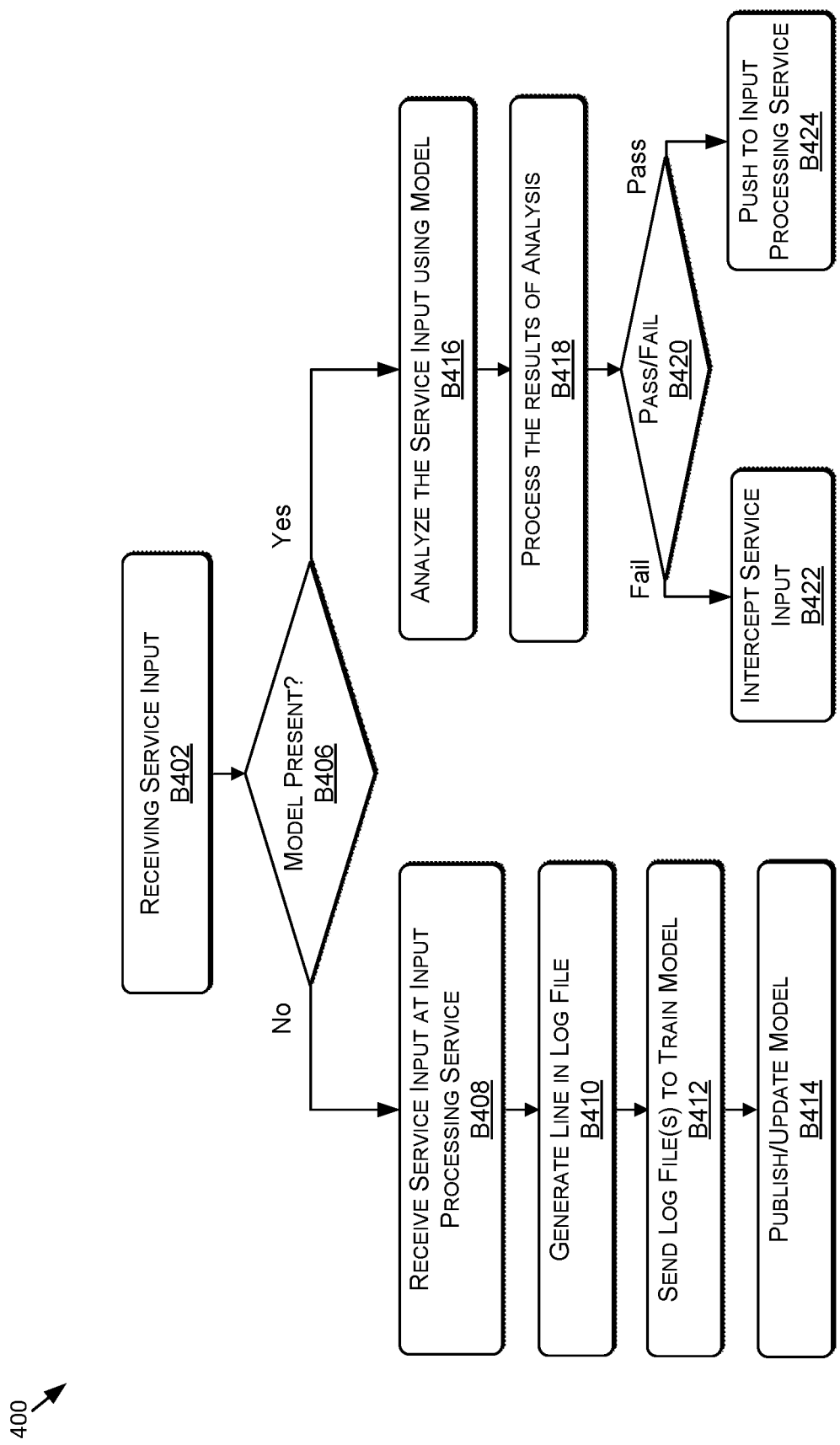
FIG. 4 is a flow diagram showing a method that an application firewall may use to process service inputs for desirability, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIGS. 1A-1C and/or FIGS. 3A-3C. However, this method may additionally or alternatively be executed by any one system, or any combination of systems, including, but not limited to, those described herein.

The method 400, at block B402, includes receiving a service input. For example, the firewall system 106 may receive the service input being transmitted from one of the source systems 102. By receiving the service input, the firewall system 106 can intercept the service input prior to receipt by one of the input processing services 118.

The method 400, at block B406, includes determining the presence of a model. For example, the model selector 112 of the firewall system 106 may determine whether a model has been generated, trained, and/or is in a suitable condition for evaluating the desirability of the service input. This may be based on, for example, an identifier of the application and/or input processing service 118 (e.g., a network port or web socket identifier), which may be determined and/or extracted from the service input. Due to the training process used to train a model, there may be some amount of bootstrap time during which service inputs are collected and an initial model is trained before a fully functional application firewall 126 is deployed that can accurately predict and/or intercept inputs that are not likely to be good. Furthermore, a model may become outdated after a period of deployment.

If, at block B406, the determination is made that a suitable model is not present, the method 400 may proceed to block B408, which includes receiving the service input at an input processing service. For example, one of the input processing services 118 may receive the service input pushed by the communications manager 108 of the firewall system 106. The method 400 may then proceed to block B410, which includes generating a line in a log file based on a result of running the received service input. Such a line in the log file can also include, for example, one or more parameters of the service input.

The method 400 may proceed to block B412 where the log file(s) can be sent to train a model. For example, the log file(s) can be received by the communication manager 304 of the model training system 302. The log file(s) can be batched by, for example, the training data determiner 306 of the model training system 302. The training data determiner 306 can designate a first portion of the received log file(s) for use in training a model and a second portion of the received log file(s) for use in validating the model. Actual training of the model can be performed using the model trainer 312 to generate the model 314. In embodiments, where the model 314 uses a GAN architecture, the model 314 may correspond to the model 314A of FIG. 3B and comprise the synthesizer portion 316 and the discriminator portion 318.

The method 400 may proceed to block B414 where a model may be published and/or updated. For example, the model determiner 310 of the model training system 302 can select a model to publish. The model determiner 310 can select a candidate model from candidate models generated or trained using the model trainer 312. For instance, upon completion of training and/or updating the model 314A, the model 314B can be published for use by the firewall 126A on the firewall system 106. In embodiments, the model 314A can be the same as the model 314B or may be a portion thereof.

If, at block B406, a suitable model is present, the method 400 may proceed to block B416, which includes analyzing the service input using the model. For example, the model selector 112 of the firewall system 106 can be used to select a model that can be used to evaluate the desirability of the service input. For instance, the model selector 112 can select a model for use based on a configuration of an application of the input processing services 118 and/or identifier of the application and/or input processing service 118. Identifying a model based on the correct configuration may ensure that the service input is accurately analyzed using the model (e.g., does not contain additional data inputs that the model was not trained to evaluate). Further at block B416, the result predictor 114 may use the selected model to analyze the service input in order to make a prediction regarding a result of running or processing the service input.

The method 400 may proceed to block B418 where the results of the analysis are processed. For example, the action determiner 116 of the firewall system 106 may apply the security rules to the prediction from the result predictor 114 to determine whether to take an action regarding the service input and/or what action to take. This may include comparing one or more confidence scores (e.g., values) representative of the prediction to one or more threshold values.

The method 400 may proceed to block B420 where an action is determined based on the results of the analysis. For example, the action determiner 116 of the firewall system 106 can operate based on the analysis performed and the security rules. This action can be based on a likelihood of the desirable outcome and/or a particular status code or class or type of status code being above a predefined threshold. This analysis indicate a pass or a fail for the service input.

When the analysis indicates the likelihood of a desirable outcome is above a predefined threshold (e.g., the service input is predicted to be desirable), this can indicate a pass at block B420. In this case, the method 400 may proceed to block B424 where the service input can be pushed through to an input processing service and/or the server. For example, the service input can be pushed from the firewall system 106 to the input processing service 118A.

When the analysis by the result predictor 114 indicates the likelihood of a desirable outcome is below a predefined threshold (e.g., the service input is predicted to be undesirable), this can indicate a fail at block B420. In this case, the method 400 may proceed to block B422 where the service input can be intercepted. For example, the action determiner 116 of the firewall system 106 can determine that the service input should be intercepted. As an example, the action determiner 116 can determine that the service input should be intercepted by dropping or blocking the service input. In some embodiments, when the action determiner 116 determines that the service input is predicted to be undesirable, a validation process may be initiated (e.g., to determine whether the prediction was a false positive). Such a validation process may be initiated using the communications manager 108. For example, the validation process may include executing a CAPTCHA. If the CAPTCHA results in validation the service input may be pushed to the input processing service for processing. Otherwise, the service input may be dropped so that it does not reach the input processing service.

Figure 5:
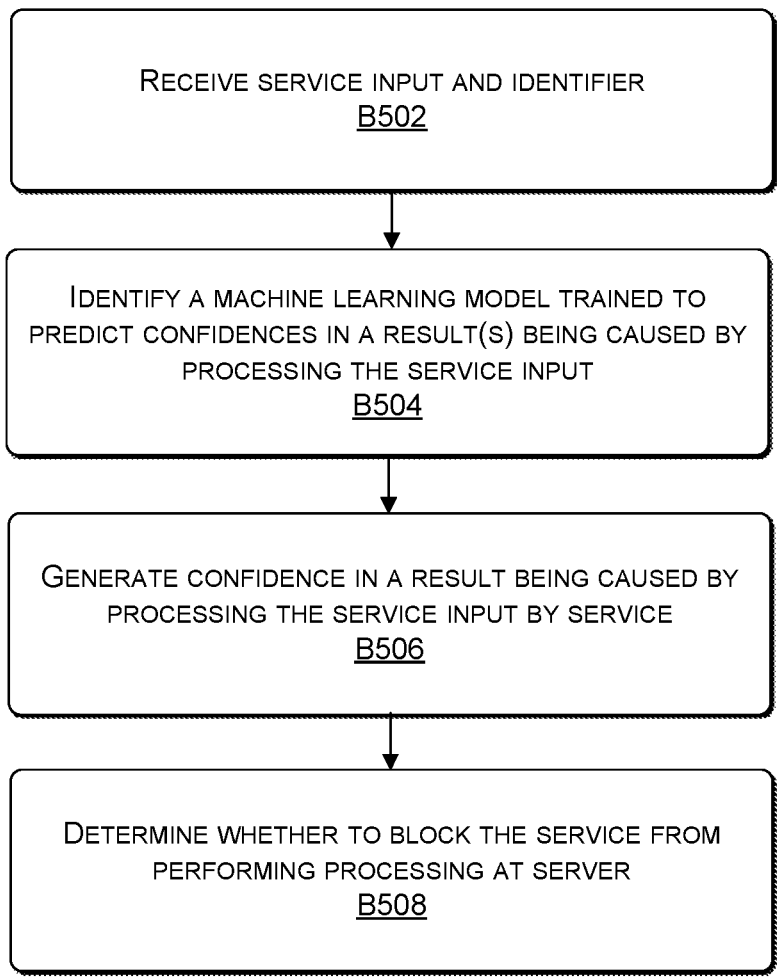
FIG. 5 is a flow diagram showing a method for determining whether to block a service input from being processed at a server, in accordance with some embodiments of the present disclosure.

FIG. 5 is a flow diagram showing a method 500 for determining whether to block a service input from being processed at a server, in accordance with some embodiments of the present disclosure, in accordance with some embodiments of the present disclosure. The method 500, at block B502, includes receiving a service input and identifier. The identifier can indicate an input processing service for processing the service input at a server. For example, the firewall system 106 may receive the service input being transmitted from one of the source systems 102 to be processed by one of the input processing services 118. By receiving the service input, the firewall system 106 can intercept the service input prior to receipt by one of the input processing services 118. In some embodiments, after intercepting the service input, the service input can be vectorized. For example, the input vectorizer 110 of the firewall system 106 may perform vectorization actions on the service input.

The method 500, at block B504, includes identifying a machine learning model trained to predict confidence in a result(s) being caused by processing the service input. For example, the model selector 112 of the firewall system 106 can be used to select a model that can be used to evaluate the desirability of the service input. For instance, the model selector 112 can select a model for use based on the identifier.

The method 500, at block B506, includes generating a confidence in a result being caused by processing the service input by the service. For example, the result predictor 114 of the firewall system 106 can be used to generate a prediction corresponding to a confidence in a result being caused by processing the service input by the service. In particular, the result predictor 114 can run a trained model (e.g., the model selected by the model selector 112).

The method 500, at block B506, includes determining whether to block a service from performing processing at a server. For example, the action determiner 116 of the firewall system 106 can operate based on the analysis performed, for example, by the result predictor 114 of the firewall system 106. To do so, the prediction may be applied to one or more security rules.

Figure 6:
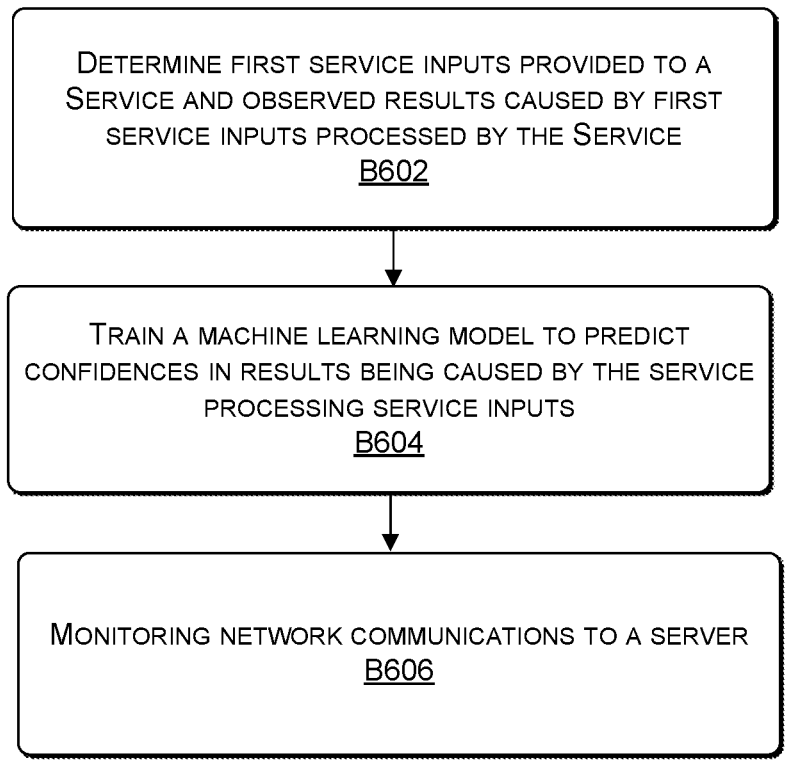
FIG. 6 is a flow diagram showing a method for training a machine learning model that can be used as a firewall, in accordance with some embodiments of the present disclosure.

FIG. 6 is a flow diagram showing a method 600 for training a machine learning model that can be used in a firewall, in accordance with some embodiments of the present disclosure. The method 600, at block B602, includes determining first service inputs provided to a service and observed results caused by the first service inputs being processed by the service. For example, the training data determiner 306 can determine the service inputs and observed results that can be used for use in training a model (e.g., from log files).

The method 600, at block B604, includes training a machine learning model to predict confidences in results being caused by the service processing service inputs. For example, a machine learning model can be trained to predict confidences in at least one result being caused by the service processing service inputs using the first service inputs as training inputs to the MLM and the observed results (e.g., status codes, labels, classes, types, etc.) caused by the first service inputs as ground truth values. For example, training of the model can be performed using the model trainer 312.

The method 600, at block B606, includes monitoring network communications to a server. For example, network communications to a server can be monitored based at least in part on predictions generated by the model from second service inputs extracted from the network communications. For example, the communications manager 108 of the firewall system 106 may monitor the service inputs being transmitted from one or more of the source systems 102 to one of the input processing services 118. By receiving the service inputs, the firewall system 106 can intercept the service inputs prior to receipt by one of the input processing services 118.

Figure 7:
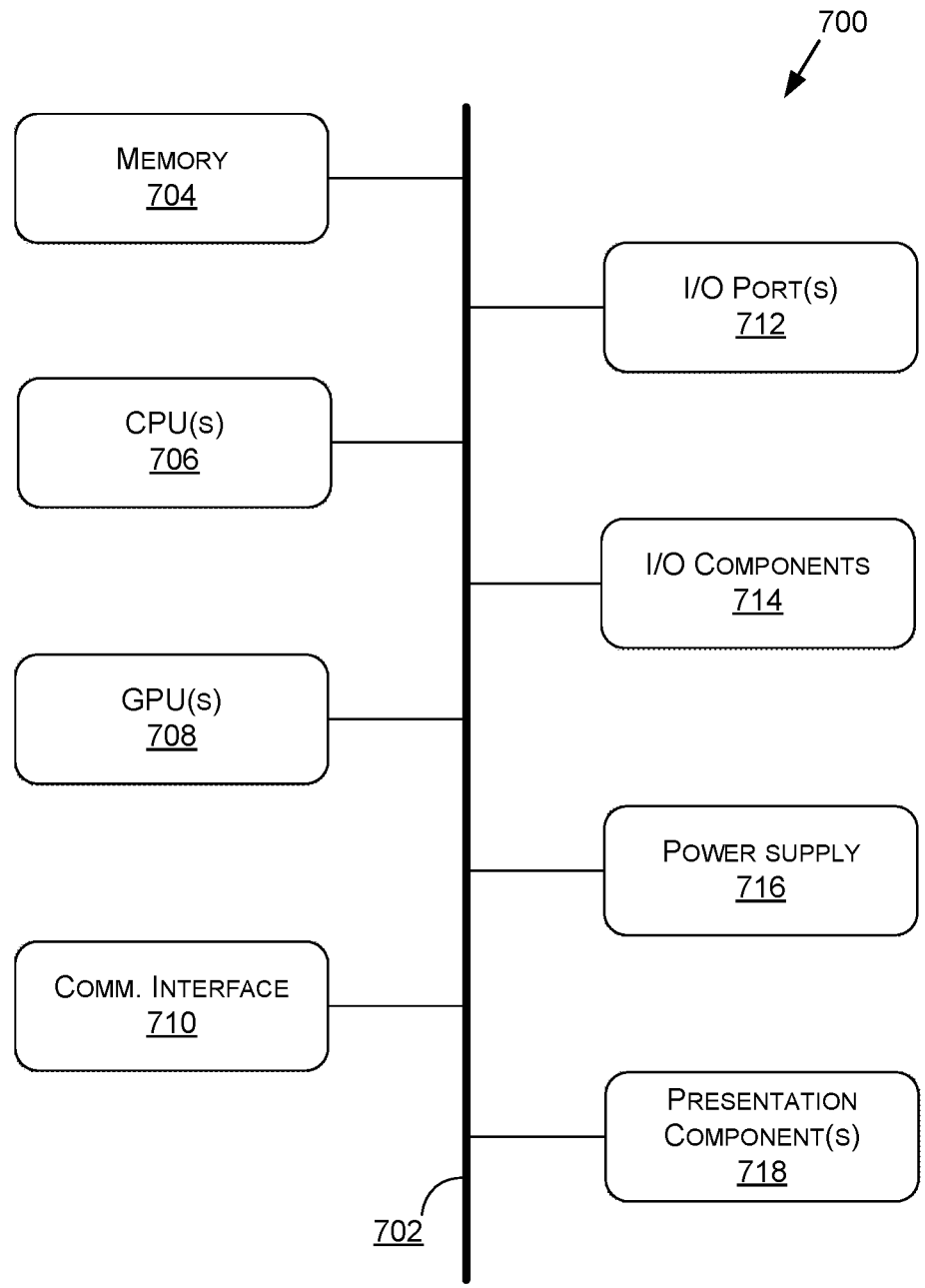
FIG. 7 is a block diagram of an example computing device suitable for use in implementing some embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or a processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704.

The GPU(s) 708 may include two or more GPUs operating in parallel (e.g., via a link). When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, from one or more network communications, first data representative of a service input and an application identifier that indicates a service for processing the service input, the application identifier being of an application corresponding to the service;
   intercepting, by a firewall system the service input prior to a computing system processing the service input;
   selecting, based at least on the application that corresponds to the service, a schema from a plurality of schemas;
   generating, according to the schema, a representation of the service input;
   selecting by the firewall system, using the application identifier and from a plurality of machine learning models (MLMs), a machine learning model (MLM) to evaluate the service input;
   providing the representation of the service input as an input to the MLM selected from the plurality of MLMs;
   evaluating, by the firewall system, using the MLM selected from the plurality of MLMs, the representation of the service input to generate a confidence score corresponding to one or more status codes for the service input, wherein the MLM is trained to predict the one or more status codes that would be generated as output by the computing system responsive to the computing system processing the service input using the service;

comparing, by the firewall system, the confidence score with a predefined threshold value; and blocking, by the firewall system, the service from initiating the processing of the service input based at least on the comparing indicating the confidence score is below the predefined threshold value.

2. The method of claim 1, wherein the generating the representation of the service input includes:

vectorizing the service input using the schema to generate a vectorized representation of the service input.

3. The method of claim 1, wherein the MLM is further trained to predict one or more likelihoods that the one or more status codes for the service input would be valid, and the blocking is based at least on determining, using the one or more likelihoods, the one or more status codes are invalid for the service input.

4. The method of claim 1, wherein the MLM is trained using ground truth labels for a plurality of service inputs, the ground truth labels including a plurality of status codes output by one or more instances of the service responsive to the one or more instances processing the plurality of service inputs.

5. The method of claim 1, wherein the MLM is trained using output by one or more instances of the service and a second MLM of the plurality of MLMs is trained using second output by one or more instances of a second service.

6. The method of claim 1, wherein the one or more status codes correspond to one or more of a predicted fault occurring in the computing system, a predicted error being generated in the computing system, or a predicted crash occurring in the computing system.

7. The method of claim 1, wherein the one or more status codes include one or more HyperText Transfer Protocol status codes.

8. The method of claim 1, wherein the MLM is trained using data representing one or more outputs produced by the computing system as one or more ground truth outputs for the MLM.

9. The method of claim 1, wherein the MLM comprises at least one of a discriminator of a Generative Adversarial Network (GAN) or a multi-step-ahead forecasting model.

10. A processor comprising:
one or more circuits to:
receive, from one or more network communications, first data representative of a service input and an application identifier that indicates a service for processing the service input, the application identifier being of an application corresponding to the service;
intercept, by a firewall system the service input prior to a computing system processing the service input;
select, based at least on the application that corresponds to the service, a schema from a plurality of schemas;
generate, according to the schema, a representation of the service input;
select by the firewall system, using the application identifier and from a plurality of machine learning models (MLMs), a machine learning model (MLM) to evaluate the service input;
provide the representation of the service input as an input to the MLM selected from the plurality of MLMs;
evaluate, by the firewall system, using the MLM selected from the plurality of MLMs, the representation of the service input to generate a confidence score corresponding to one or more status codes for the service input, wherein the MLM is trained to predict the one or more status codes that would be generated as output by the computing system responsive to the computing system processing the service input using the service;
compare, by the firewall system, the confidence score with a predefined threshold value; and
block, by the firewall system, the service from initiating the processing of the service input based at least on the comparing indicating the confidence score is below the predefined threshold value.

11. The processor of claim 10, wherein the firewall system corresponds to a front end of the computing system and receives the MLM from a back end of the computing system for the evaluating of the representation of the service input.

12. The processor of claim 10, wherein the blocking is based at least on applying security rules to one or more predictions generated using the MLM.

13. The processor of claim 10, wherein the MLM includes a discriminator that predicts the confidence score.

14. The processor of claim 10, wherein the blocking is based at least on at least one status code of the one or more status codes indicating a server error would result from the computing system processing the service input.

15. The processor of claim 10, wherein the one or more status codes correspond to one or more of a predicted fault occurring in the computing system, a predicted error being generated in the computing system, or a predicted crash occurring in the computing system.

16. The processor of claim 10, wherein the MLM is trained using data representing one or more outputs produced by the computing system as one or more ground truth outputs for the MLM.

17. A system comprising:
one or more hardware processing devices to cause instantiation of a firewall system to perform operations including:
receiving, from one or more network communications, first data representative of a service input and an application identifier that indicates a service for processing the service input, the application identifier being of an application corresponding to the service;
intercepting the service input prior to a computing system processing the service input;
selecting, based at least on the application that corresponds to the service, a schema from a plurality of schemas;
generating, according to the schema, a representation of the service input;
selecting, using the application identifier and from a plurality of machine learning models (MLMs), a machine learning model (MLM) to evaluate the service input;
providing the representation of the service input as an input to the MLM selected from the plurality of MLMs;
evaluating, using the MLM selected from the plurality of MLMs, the representation of the service input to generate a confidence score corresponding to one or more status codes for the service input, wherein the MLM is trained to predict the one or more status codes that would be generated as output by the computing system responsive to the computing system processing the service input using the service;
comparing the confidence score with a predefined threshold value; and blocking the service from initiating the processing of the service input based at least on the comparing indicating the confidence score is below the predefined threshold value.

18. The system of claim 17, wherein the one or more status codes include one or more HyperText Transfer Protocol status codes.

19. The system of claim 17, wherein the MLM comprises at least a discriminator of a Generative Adversarial Network (GAN).

20. The system of claim 17, wherein the MLM comprises a multi-step-ahead forecasting model.

* * * * *